United States Patent
Johnson

(10) Patent No.: US 10,148,574 B2
(45) Date of Patent: Dec. 4, 2018

(54) LOAD BALANCING FOR MESH COMPUTING

(71) Applicant: Unicorn Media, Inc., Tempe, AZ (US)

(72) Inventor: Matthew A. Johnson, Tempe, AZ (US)

(73) Assignee: Brightcove Inc., Boston, MA (US)

( * ) Notice: Subject to any disclaimer, the term of this patent is extended or adjusted under 35 U.S.C. 154(b) by 261 days.

(21) Appl. No.: 14/160,428

(22) Filed: Jan. 21, 2014

(65) Prior Publication Data

US 2015/0207754 A1 Jul. 23, 2015

(51) Int. Cl.
*G06F 15/16* (2006.01)
*H04L 12/803* (2013.01)
*H04L 29/08* (2006.01)
*G06F 9/50* (2006.01)
*H04L 29/06* (2006.01)

(52) U.S. Cl.
CPC ............ *H04L 47/125* (2013.01); *G06F 9/505* (2013.01); *H04L 29/08072* (2013.01); *H04L 29/06* (2013.01)

(58) Field of Classification Search
CPC .......................... H04L 29/06; H04L 29/08072; H04L 63/0428
USPC ................................ 709/220, 224, 226, 225
See application file for complete search history.

(56) References Cited

U.S. PATENT DOCUMENTS

| | | | | |
|---|---|---|---|---|
| 7,065,579 B2 * | 6/2006 | Traversat | ............... | G06F 9/4416 709/225 |
| 7,181,523 B2 * | 2/2007 | Sim | ............................... | 709/226 |
| 7,440,428 B2 * | 10/2008 | Bates | .................... | H04L 67/104 370/329 |
| 8,145,782 B2 | 3/2012 | McGowan et al. | | |
| 8,327,013 B2 | 12/2012 | McGowan et al. | | |
| 8,914,511 B1 * | 12/2014 | Yemini | ................... | G06Q 10/06 705/7.35 |
| 8,943,567 B2 * | 1/2015 | Jussila | ................... | H04W 12/06 380/46 |
| 9,129,092 B1 * | 9/2015 | Dorwin | ............... | G06F 21/6209 |
| 9,244,777 B2 * | 1/2016 | Boullery | ............. | G06F 11/1461 |
| 9,450,836 B2 * | 9/2016 | Hammer | ................. | H04L 41/50 |
| 9,769,292 B2 * | 9/2017 | Smith | ...................... | G06F 9/542 |
| 2002/0083118 A1 * | 6/2002 | Sim | ................................ | 709/105 |
| 2002/0156893 A1 * | 10/2002 | Pouyoul | ................... | G06F 9/544 709/225 |
| 2005/0010754 A1 * | 1/2005 | Brendel | .................... | H04L 63/04 713/153 |
| 2008/0270610 A1 * | 10/2008 | John | ................... | G06F 17/30017 709/226 |
| 2010/0023621 A1 * | 1/2010 | Ezolt | .................. | H04L 29/12066 709/226 |
| 2011/0016223 A1 * | 1/2011 | Iannaccone | ............. | H04L 45/00 709/232 |

(Continued)

*Primary Examiner* — Kanh Q Dinh
(74) *Attorney, Agent, or Firm* — Kilpatrick Townsend & Stockton, LLP

(57) ABSTRACT

Techniques for load balancing in a network of nodes can include a first node receiving and/or generating a request having an identifier, task description, and information regarding an entity originating the request. The first node can either perform the task and report back to the originating entity of the completion of the task, or forward the request to a random one of a plurality of other nodes with which the first node is communicatively connected.

18 Claims, 7 Drawing Sheets

(56) References Cited

U.S. PATENT DOCUMENTS

| | | | |
|---|---|---|---|
| 2011/0066672 A1* | 3/2011 | Zamarreno | G06F 9/466 709/203 |
| 2011/0225594 A1* | 9/2011 | Iyengar et al. | 718/105 |
| 2013/0346751 A1* | 12/2013 | Hannel | H04L 63/105 713/168 |

* cited by examiner

LOAD BALANCING FOR MESH COMPUTING

BACKGROUND OF THE INVENTION

As the number of Internet users grows and as Internet connection speeds continue to increase, there are increasingly more Internet services available "in the cloud." For example, video transcoding and distribution, file storage, speech recognition, and applications such as email and other productivity tools now often utilize networks of computers (e.g., server clusters) to perform functions remotely in addition or alternative to performing those functions on an end-user device.

Efficient execution of tasks among networked computers requires load balancing to distribute tasks to the computers able to perform those tasks in a manner that helps maximize processing resources. Although advances have been made in load balancing, there is still room for improvement.

BRIEF SUMMARY OF THE INVENTION

Techniques disclosed herein provide for load balancing in a network of nodes where each node comprises, for example, a computer server. Techniques include a first node receiving and/or generating a request having an identifier, task description, and information regarding an entity originating the request. The first node can either perform the task and report back to the originating entity of the completion of the task, or forward the request to a random one of a plurality of other nodes with which the first node is communicatively connected. The first node can further store the request identifier to prevent An example server configured to operate as a node in a network of nodes, according to the disclosure, includes a communication interface configured to be communicatively coupled with a plurality of nodes of the network of nodes, a memory, and a processing unit. The processing unit is communicatively coupled with the communication interface and the memory and configured to obtain a first request comprising a request identifier a description of a first task to perform, and information regarding an entity originating the first request. The processing unit is further configured to determine that the server does not have sufficient resources to perform the first task, as a result of the determination, select a node from the plurality of nodes, and send, via the communication interface, the first request to the selected node.

The server can include one or more of the following features. The processing unit can be further configured to store the request identifier of the first request in the memory. The processing unit can be further configured to receive a second request, compare a request identifier of the second request with the stored request identifier of the first request, and send a response to a sender of the second request an indication that the server has already received a request having the same request identifier. The processing unit can be configured to select the node from the plurality of nodes by randomly selecting the node using a uniform distribution. The processing unit can be configured to select the node from the plurality of nodes by randomly selecting the node using a weighted distribution. The processing unit can be further configured to create the weighted distribution by assigning a weight to each of the plurality of nodes based on either or both of a geographical location or distance, or historical information regarding each of the plurality of nodes. The processing unit can be further configured to receive, via the communication interface, a second request comprising a second request identifier, a description of a second task to perform, and information regarding an entity originating the second request; perform the second task; and send, via the communication interface, an indication to the entity originating the second request that the second task has been performed. The processing unit can be configured to obtain the first request by receiving the first request via the communication interface from one of the plurality of nodes. The processing unit can be configured to obtain the first request by generating the first request.

An example method of load balancing in a network of nodes can include obtaining a first request comprising a request identifier, a description of a first task to perform, and information regarding an entity originating the first request. The method further includes determining, using a physical processing unit, that a computing system does not have sufficient resources to perform the first task, as a result of the determination, selecting a node from a plurality of nodes to which the computing system is communicatively connected, and sending the first request to the selected node.

The method can include one or more of the following features. The method can include storing the request identifier of the first request in a memory. The method can include receiving a second request, comparing a request identifier of the second request with the stored request identifier of the first request, and sending a response to a sender of the second request an indication that the computing system has already received a request having the same request identifier. Selecting the node from the plurality of nodes can include randomly selecting the node using a uniform distribution. Selecting the node from the plurality of nodes can include randomly selecting the node using a weighted distribution. The method can include receiving, a second request comprising a second request identifier, a description of a second task to perform, and information regarding an entity originating the second request; performing the second task; and sending an indication to the entity originating the second request that the second task has been performed.

An example non-transitory computer-readable medium can have instructions embedded thereon for providing load balancing in a network of nodes. The instructions include computer code for obtaining a first request comprising a request identifier, a description of a first task to perform, and information regarding an entity originating the first request. The instructions further include computer code for determining that a computing system does not have sufficient resources to perform the first task, as a result of the determination, selecting a node from a plurality of nodes to which the computing system is communicatively connected, and sending the first request to the selected node.

The computer-readable medium can include computer code for implementing one or more of the following features. Storing the request identifier of the first request in a memory. Receiving a second request, comparing a request identifier of the second request with the stored request identifier of the first request, and sending a response to a sender of the second request an indication that the computing system has already received a request having the same request identifier. Selecting the node from the plurality of nodes can include randomly selecting the node using a uniform distribution. Receiving, a second request comprising a second request identifier, a description of a second task to perform, and information regarding an entity originating the second request; performing the second task; and sending an indication to the entity originating the second request that the second task has been performed.

Items and/or techniques described herein may provide one or more of the following capabilities, as well as other capabilities not mentioned. Techniques herein require minimal amounts of processing resources and are scalable to any number of nodes. Furthermore, the disclosed techniques can enable a network to add nodes with relative ease, as compared with traditional methods. These and other embodiments, along with many of its advantages and features, are described in more detail in conjunction with the text below and attached figures.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides a description of one or more example embodiments only, and is not intended to limit the scope, applicability, or configuration of the disclosure. Rather, the ensuing description of the embodiment(s) will provide those skilled in the art with an enabling description for implementing various embodiments of the invention. It is understood that various changes may be made in the function and arrangement of elements without departing from the spirit and scope as set forth in the appended claims.

As the number of Internet users grows and as Internet connection speeds continue to increase, there are increasingly more Internet services available "in the cloud." For example, video transcoding and distribution, file storage, speech recognition, and applications such as email and other productivity tools now often utilize networks of computers (e.g., server clusters) to perform functions remotely in addition or alternative to performing those functions on an end-user device. Accordingly, the distribution of work among the computers in the network, known as "load balancing," is important to help ensure the network operates efficiently. Embodiments of the present invention implement simple and elegant techniques for providing load balancing.

Figure 1:
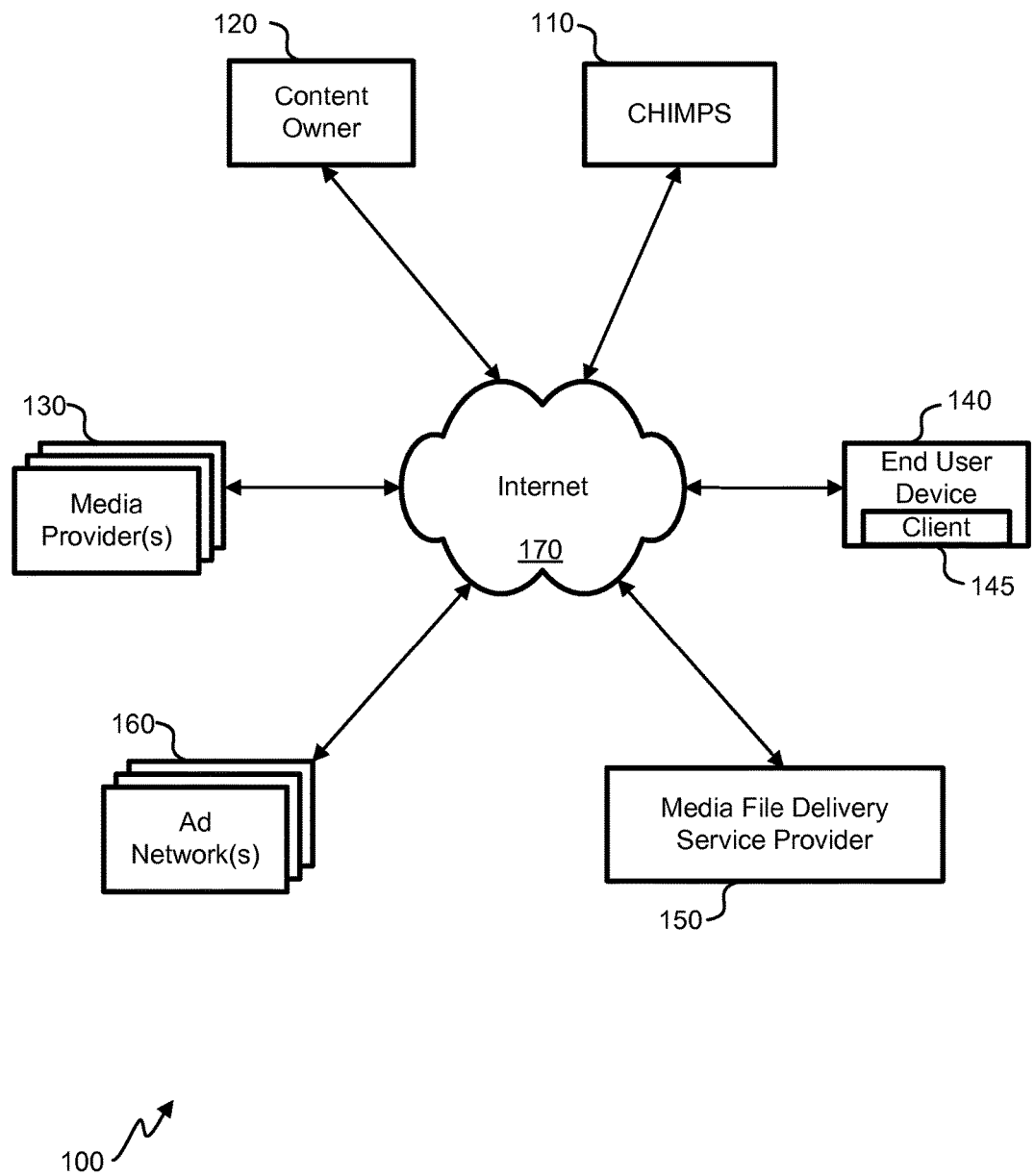
FIG. 1 is a block diagram illustrating an embodiment of a media servicing system, providing an example of a system that can utilize the load-balancing techniques discussed herein.

FIG. 1 is a block diagram illustrating an embodiment of a media servicing system 100, which can utilize the load-balancing techniques discussed herein. It will be understood, however, that the media servicing system 100 is provided only as an example system utilizing load balancing. A person having ordinary skill in the art will recognize that the load-balancing techniques provided herein can be utilized in any of a wide variety of additional applications other than media servicing.

The illustrated media servicing system 100 may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game system, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

Media content provided by one or more media providers 130 can be processed and indexed by cloud-hosted integrated multi-node pipelining system (CHIMPS) 110, and ultimately stored on media file delivery service provider (MFDSP) 150, such as a content delivery network, media streaming service provider, cloud data services provider, or other third-party media file delivery service provider. (Additionally or alternatively, the CHIMPS 110 may also be adapted to store the media file.) The content (both live and on-demand) can utilize any of a variety of forms of streaming media, such as chunk-based media streaming in which a media file or live stream is processed, stored, and served in small segments, or "chunks." Additional detail regarding techniques, can be found in U.S. Pat. No. 8,327,013 entitled "Dynamic Index File Creation for Media Streaming" and U.S. Pat. No. 8,145,782, entitled "Dynamic Chunking For Media Streaming," both of which are incorporated by reference herein in their entirety.

A content owner 120 can utilize one or more media provider(s) 130 to distribute media content owned by the content owner 120. For example, a content owner 120 could be a movie studio that licenses distribution of certain media through various media providers 130 such as television networks, Internet media streaming websites and other on-demand media providers, media conglomerates, and the like. In some configurations, the content owner 120 also can operate as a media provider 130. The content owner 120 and/or media provider(s) 130 can further enter into an agreement with one or more ad network(s) 160 to provide advertisements for ad-supported media streaming.

Techniques for load balancing provided herein can apply to systems such as the CHIMPS 110, MFDSP 150, ad network(s) 160, and the like, which can employ a plurality of computers to provide services such as media ingesting, transcoding, storage, delivery, etc. Again, the load-balancing techniques provided here can, however, extend to a wide variety of applications beyond the media servicing system 100 of FIG. 1.

Figure 2:
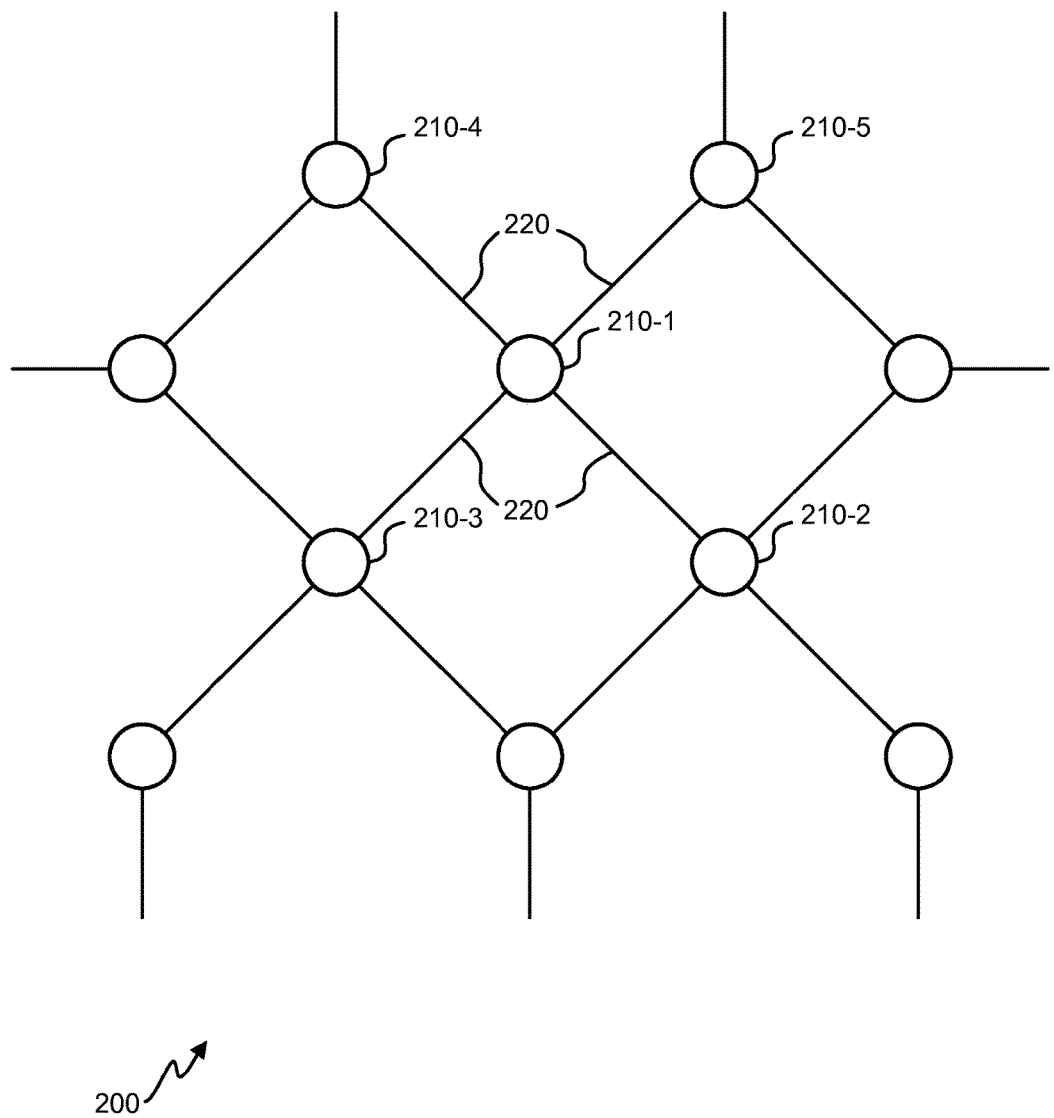
FIG. 2 is a simplified illustration of a portion of a network of nodes, according to one embodiment.

FIG. 2 is a simplified illustration of a portion of a network 200 of nodes 210, according to one embodiment. In this embodiment each node 210 (e.g., computer server) is communicatively connected with up to four other nodes 210. For example, the node 210-1 is communicatively connected with four additional nodes 210-2, 210-3, 210-4, and 210-5 via communication links 220. In other embodiments, however, the number of nodes 210 with which the first node 210-1 is connected can be greater or fewer than four.

The characteristics of network 200 may vary, depending on desired functionality. In some networks, for example, there may be specialized nodes 210. That is, some nodes 210 may be designated to perform particular tasks that other nodes 210 may not be able to perform. Such configurations may exist where licensing provisions or other restrictions prohibit the amount of nodes 210 on which certain tasks may be performed. In alternative networks, however, all nodes 210 may be functionally identical. That is, all nodes 210 may be configured to perform all tasks. For example, in a network 200 of nodes 210 in the CHIMPS 110 of FIG. 1, all nodes 210 may be configured to perform media chunking, transcoding, media ingest, and the like.

The resources available to each node 210 can vary, depending on desired functionality. In many embodiments, for example, each node can comprise a computer system, such as the computer system illustrated in FIG. 7 and described in further detail below. For a network 200 utilized in a CHIMPS 110 of FIG. 1, for example, each node 210 may include a cache in order to store data and media files locally. Nodes 210 may include other specialized features, depending on application.

Work can be requested and/or distributed among the nodes 210 in the network 200 in the form of requests. Requests can arise in any of a variety of ways. For example, nodes 210 may be communicatively coupled with one or more additional entities (not shown), such as an Application Programming Interface (API), which can generate and/or distribute requests in a synchronous and/or asynchronous fashion. Requests can, for example, be generated by outside entities requesting certain functionality from the network 200 requiring certain tasks to be performed. Additionally or alternatively, nodes 210 themselves may generate requests from received requests (e.g., by splitting a task into subtasks) and/or other sources.

Figure 3:
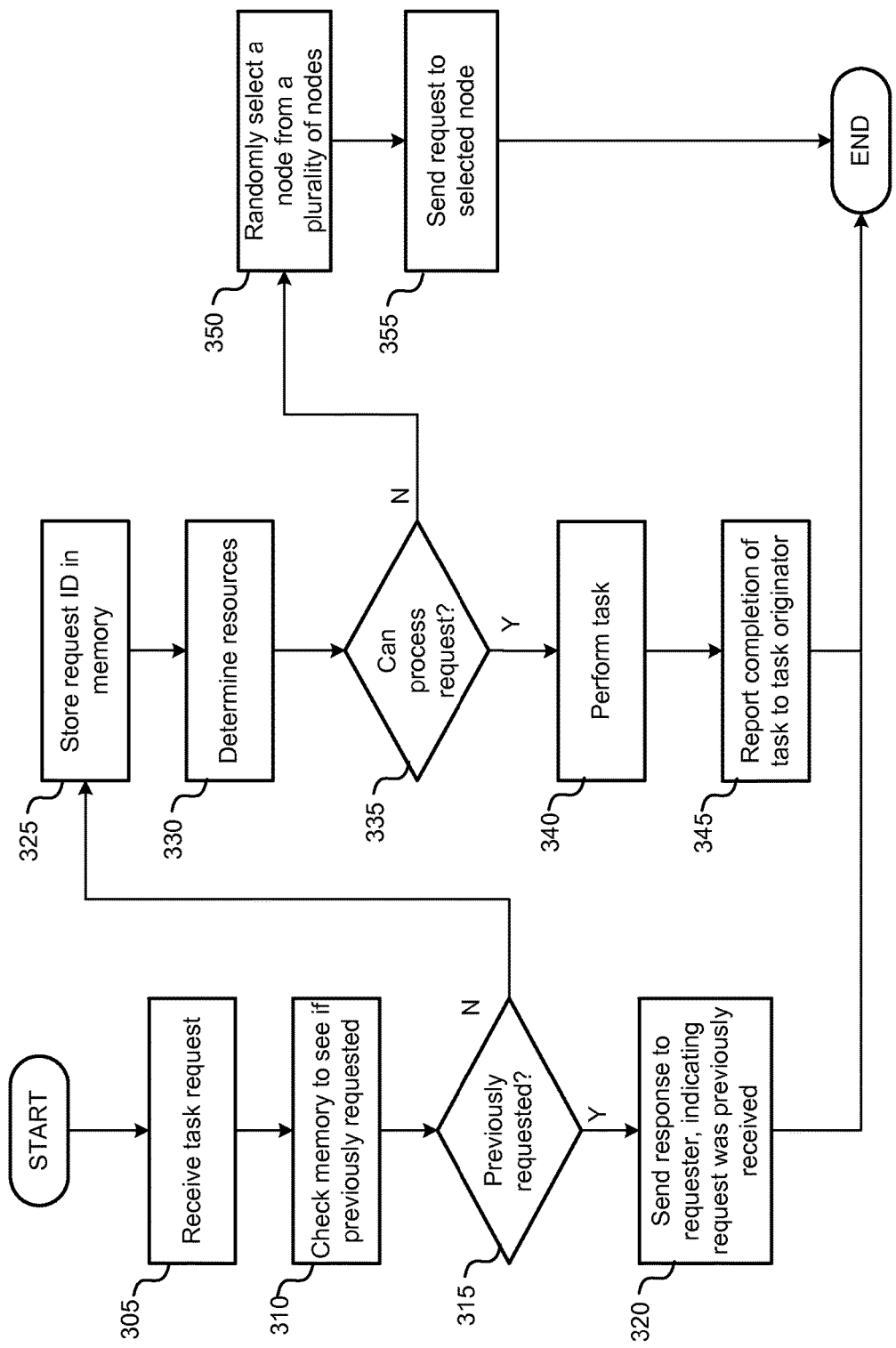
FIG. 3 is a flow chart illustrating the work flow for processing incoming requests, at a node, according to one embodiment.

FIG. 3 is a flow chart illustrating the work flow for processing incoming requests, at a node 210, according to one embodiment. As with other figures provided herein, however, the embodiment depicted in FIG. 3 is provided as an illustrative example. Other embodiments may add, omit, combine, separate, and/or rearrange components, depending on desired functionality. A person of ordinary skill in the art will recognize many variations.

At block 305 a task request is received. The request can be generated in any of a variety of formats and languages, depending on desired functionality. In some embodiments, for example, the request is presented in JavaScript Object Notation (JSON). Embodiments may additionally or alternatively utilize XML and/or other languages and formats.

A request can include various types of information, such as a request identifier, a description of a task to perform, information regarding an entity originating the first request, and so forth. A request identifier can be, for example, an identifier that uniquely identifies a task in the network 200. The ability to uniquely identify a request can help the request be tracked in the network 200, enabling the network to determine which node(s) 210 the request has been sent to and when the request is completed.

A description of a task to perform can also vary, depending on the functionality of the network 200. In the CHIMPS 110 of FIG. 1, for example, the description of the task can include a description of a media file to upload, transcode, store, and/or serve. In some embodiments, a node 210 may recognize that a task can be further split into a plurality of subtasks. In such instances, the node 210 can generate a plurality of requests, each corresponding to a subtask. The node can then process each subtask as it would a regular task (e.g., by following the workflow depicted in FIG. 3). In some embodiments, there is no limitation regarding the type of request that can be load balanced in accordance with the techniques provided herein.

Information regarding an entity originating the request (also referred to herein as the "task originator") can enable a node 210 to report the completion of a task. Such information can include, for example, and address and/or port of a task originator. In some instances, the task originator and the node can be two different applications executed by a single computer (hardware) server. The task originator can be an entity external to, yet communicatively coupled with, the node network 200 (e.g., an API), or a node 210 within the network 200. In an example utilizing the entities depicted in FIG. 1, the CHIMPS 110 can be notified, via an API, of a new media file of a media provider(s) 130 to ingest. The API can determine one or more related tasks to execute and, for each task, generate a request and send it to a node 210 of the network 200. Using the information regarding the task originator, the node(s) 210 can report back to the API when the task(s) is/are completed.

Referring again to FIG. 3, at block 310 memory is checked to see if the task received at block 305 was previously requested. To prevent a task from being sent to a certain node 210 more than once, a node 210 can log the identifier of the request in, for example, a local memory. At block 315, the node 210 can determine whether the request was indeed previously requested (e.g., determine whether the request identifier has been previously logged). If so, at block 320, the node 210 sends a response to the requester indicating the request was previously received. The requesting entity can then choose another node 210 to which the request is to be sent. Otherwise, if the request was not previously received, then the receiving node 210 can proceed to block 325, in which the request identifier is stored in the node's memory.

At block 330, the node can determine resources available to complete the task associated with the request. This determination can entail different things, depending on the resources required to complete the task. This determination can include, for example, determining current and/or anticipated available space in a local cache and/or other storage and/or available processing capabilities. It may also include a determination of whether the node 210 is otherwise prohibited from completing a task associated with a request (e.g., determining whether the node has the capabilities and/or is licensed to perform a function).

At block 335, the node 210 determines whether it can process the request, based on the determination made at block 330. If so, the node 210 can perform the task at block 340, and report completion of the task to the task originator, at block 345, by using the information regarding the task originator included in the request, as previously discussed. In some instances, the node 210 may decide that it can process the request even when resources are not currently available (e.g., when the node 210 determines that resources will be available in the near future). In such instances, the node 210 may put the task in a queue before performing the task at block 340.

If the node determines that it cannot process the request, then it can randomly select a node from a plurality of nodes, at block 350. As shown in FIG. 2, each node 210 can be communicatively connected with a plurality of additional nodes. A new node may be selected from this plurality at random, and the original node 210 can send the request to the selected node at block 355. If the selected node indicates that it has already received the request, the original node 210 can select another new node from the remaining nodes to which it is communicatively connected.

The functionality illustrated in FIG. 3 can be implemented in a variety of ways, including hardware and/or software of a computer system, an example of which is described in further detail below in regards to FIG. 7. In some embodiments, some or all of the components of FIG. 3 are performed at the application layer. Thus, the functionality can be implemented with relative ease among nodes across various computing platforms and in various geographical locations.

Figure 4:
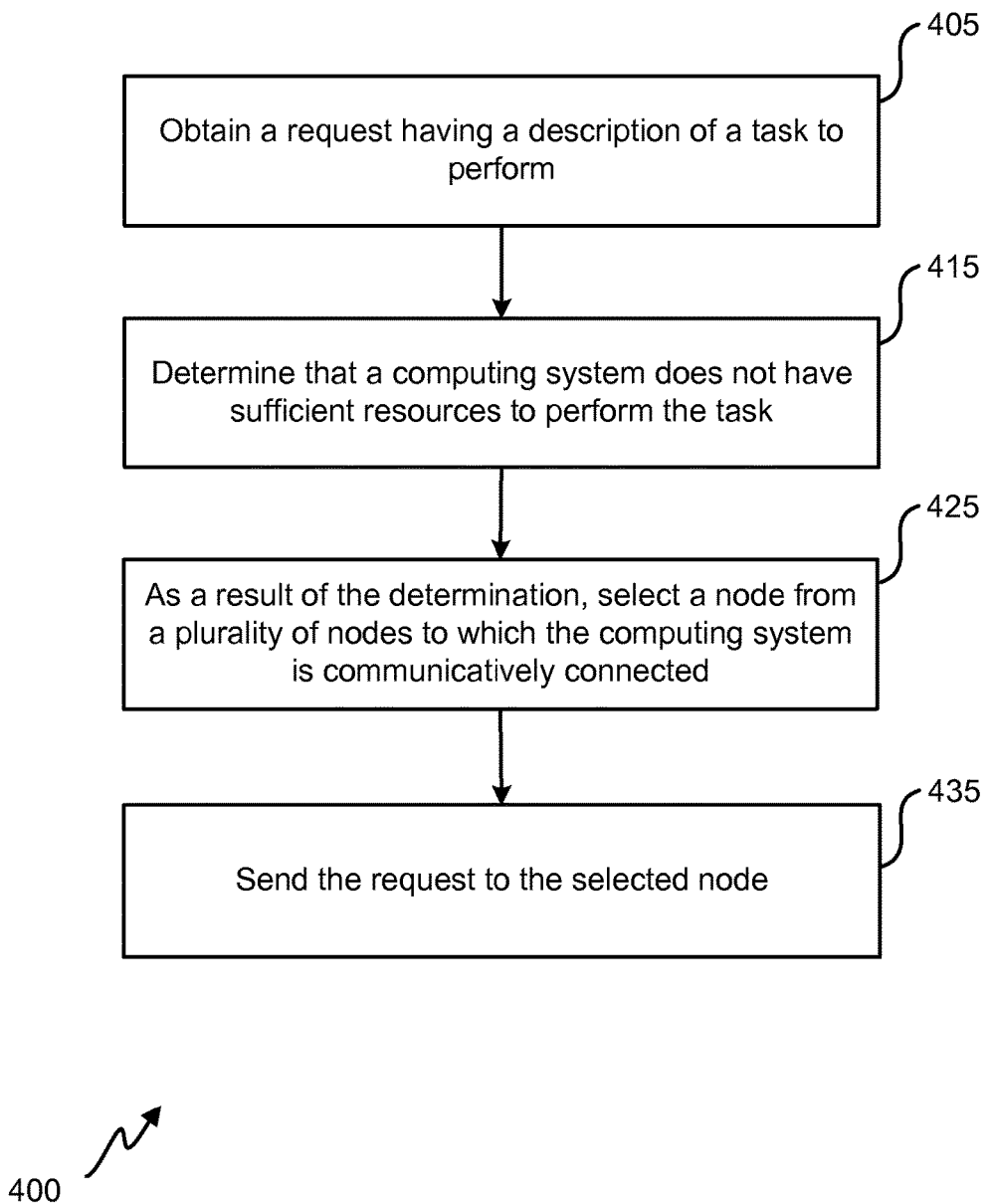
FIG. 4 is a flow diagram illustrating a method of load balancing in a network of nodes, according to one embodiment.

FIG. 4 is a flow diagram illustrating a method 400 of load balancing in a network of nodes, according to one embodiment. The method can be implemented on a node (e.g., a computing system) and may be an implementation of at least a portion of the functionality illustrated in FIG. 3. Other embodiments may add, omit, combine, separate, and/or rearrange components, depending on desired functionality. A person of ordinary skill in the art will recognize many variations.

At block 405, a request is obtained having a description of a task to perform. As indicated herein above, the request can be generated by a computing system operating as a node in a network of nodes, and/or from another entity outside the network of nodes. Additionally, the request may have a request identifier and/or information regarding an entity originating the first request.

At block 415 it is determined that a computing system does not have sufficient resources to perform the task. Different tasks may require different resources (e.g., processing power, storage, etc.), and thus the determination may be based on the specifics of the task.

At block 425, as a result of the determination, a node is selected from a plurality of nodes to which the computing system is communicatively connected. As indicated previously, the selection can be random. Alternatively, the selection of nodes can be weighted, as described below, and/or can include the use of a non-random algorithm, depending on desired functionality. At block 435, the request is sent to the selected node.

Figure 5A:
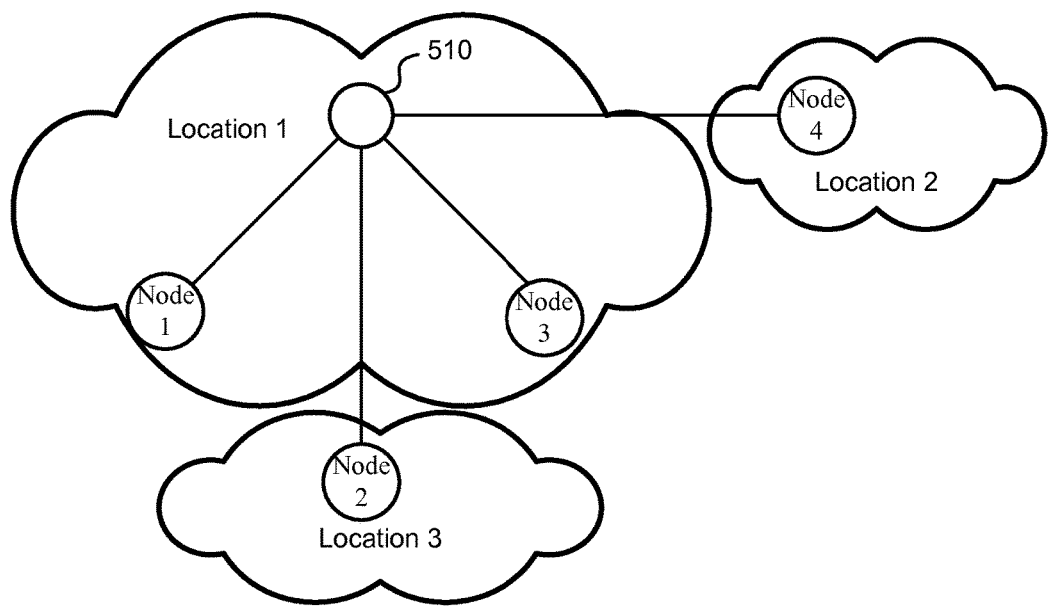
FIG. 5A is a simplified block diagram illustrating how certain nodes of a node network are geographically distributed in three different locations, according to one embodiment.
Figure 5B:
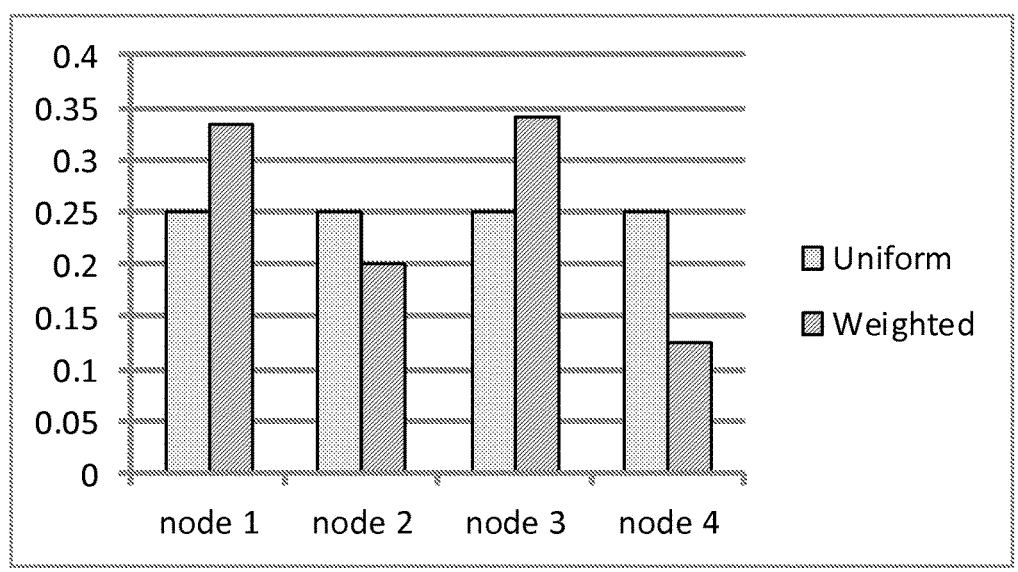
FIG. 5B is a bar graph illustrating example distributions of the selection of nodes in FIG. 5A.

According to some embodiments, the selection of a node to which a request is forwarded may not be a random selection across a uniform distribution. Various factors can be considered, which can be used to weight different nodes during the selection process. FIGS. 5A and 5B help illustrate a way in which nodes may be weighted.

FIG. 5A is a simplified block diagram illustrating an example in which certain nodes of a node network are geographically distributed in three different locations. A first node 510 is connected with four other nodes: node 1, node 2, node 3, and node 4. As illustrated, nodes 1 and 3 are co-located with the first node 510 at location 1; node 2 is at location 3, and node 4 is at location 2.

FIG. 5B is a bar graph illustrating the selection of nodes 1-4 by the first node 510 of FIG. 5A, according to a uniform distribution and a weighted distribution. As expected, in the uniform distribution, each of nodes 1-4 has a 25% likelihood of being selected. The weighted distribution, however, changes the likelihood of the selection of a node based on its geographical location. Here, the weighting includes a bias toward nodes that are nearer to the first node 510. Thus, nodes 1 and 3 are given greater weight, while nodes 2 and 4, which are at locations relatively remote from the first node 510, are given lesser weight. Accordingly, as illustrated in FIG. 5B, the likelihood that nodes 1 and 3 will be selected is greater than the likelihood that nodes 2 or 4 will be selected.

The weighting of the selection of nodes does not have to be based solely on geography. For example, weighting can be based on additional or alternative factors such as connection speed, network type, time of day, and the like. According to some embodiments, for example, nodes may weight selections based on historical information, such as according more weight to those nodes that are more likely available, according to historical data, and less weight to those nodes that are less likely available.

Techniques for load balancing provided herein can provide for a robust network that can easily add and remove nodes. As indicated herein above, the node network can be configured such that there are no nodes that are designated to perform a certain functionality, but instead, each node may be configured to provide any type of desired functionality. When a service requires licensing, a node may be temporarily enabled to perform a function according to a license agreement. The functionality may still be tied to a certain computer system, if required. Alternatively, for usage-based licensing, the network can keep track of usage among all the nodes.

To facilitate the addition and/or removal of nodes a connection index may be maintained by a computing system such as API. The API may determine the connections of each node and keep an index of these connections and nodes to facilitate changes in the network. When a node is to be joined to the network, it can contact the API. The API can then determine the connections of the network to include the new node, and indicate the new connections to all nodes affected.

Figure 6:
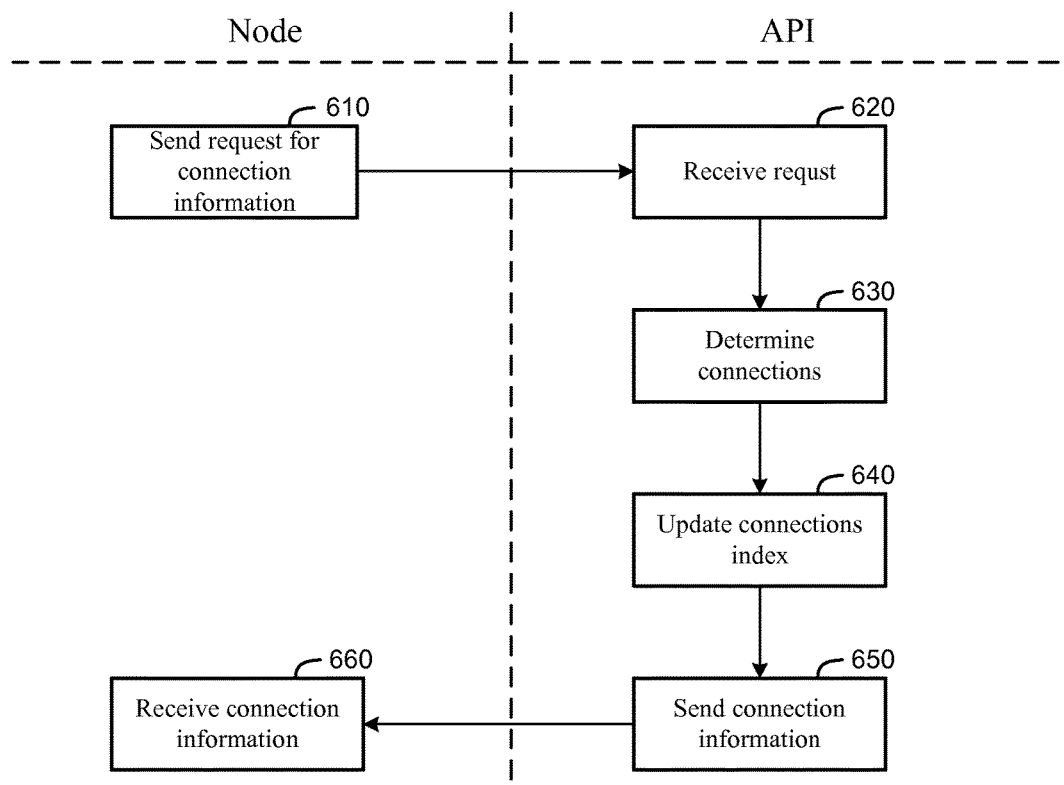
FIG. 6 is a swim-lane diagram illustrating how a node can communicate with the API to join the network of nodes, according to one embodiment.

FIG. 6 is a swim-lane diagram illustrating how a node can communicate with the API to join the network of nodes, according to one embodiment. Here, the API can be an application executed by an entity communicatively coupled with the node network, yet not a node itself. That said, other embodiments may enable a particular node to implement the functionality of the API described here. Other applications that may not be considered APIs may also be utilized to perform some or all of the functions of the API described herein. Moreover, the functionality of the API and/or node as described in FIG. 6 may be performed by separate software applications executed by a single computer system. A person of ordinary skill in the art will recognize many alterations.

At block 610, a node sends a request for connection information to the API, which receives the request at block 620. Such a request may be generated by a node to be added to a node network. In other instances, an existing node in the network may want to reset or reestablish its connections.

At block 620, the API determines the connections for the node. For an existing node, there may be no changes to the node's connections. In such a case, determining the connections for the node may simply entail looking up the connections in a database (or other data structure) in which the index of connections is maintained. However, where a new node is joining a network (or where an existing node's connections need updating), the API can implement a process by which it determines other nodes to which the new node will be connected. Any of a variety of factors can be analyzed to help make this determination.

One such factor could be geographical proximity. It may be favorable to establish connections among nodes that are geographically close, if possible. Alternatively, there may be instances in which it may be more desirable to connect a new node to a geographically diverse plurality of existing nodes.

Another factor could be available resources. A determination based on this factor could include an analysis of processing, storage, and/or other resources of the new node and/or existing nodes. In some instances it may be more desirable to establish connections of the new node with nodes of similar resources. In other instances it may be more desirable to connect nodes that are relatively rich in resources with those that are relatively poor in resources to more evenly load-balance incoming requests.

Another factor could be available connections. As indicated in previously-described embodiments, some networks may be established such that each node has a certain number of connections. It may be the case in some established node networks, however, that certain nodes are connected with fewer than the desired amount of connections for a node. In such a case, a node may have one or more available connections. That is, the node may be available to be connected with another node, without exceeding the desired number of connections.

Other factors may additionally or alternatively be considered when determining the connections of a new node. In many cases, the connections of existing nodes may need to be altered in order to incorporate the new node into the node network. It can further be noted that connections may or may not be bidirectional. That is, depending on desired functionality, some connections may be bidirectional such that nodes on either end of the connection may forward requests to the other. Other connections may be unidirectional, such that a first node may forward a request to a second node, but may not receive requests from the second node.

Once the connections are determined the API can then update the connections index at block 640 to reflect the new and/or changed connections in the node network. And at block 650, the API sends the connection information at block 650 to the node, which is received at block 660. Depending on desired functionality, the connection information may contain only the connections for the node, or may contain information regarding other connections. Furthermore, the API may propagate new connection information to a portion of the node network (e.g., to any nodes affected by changes to their connections) or all of the node network to reflect the updates to the connections index.

Figure 7:
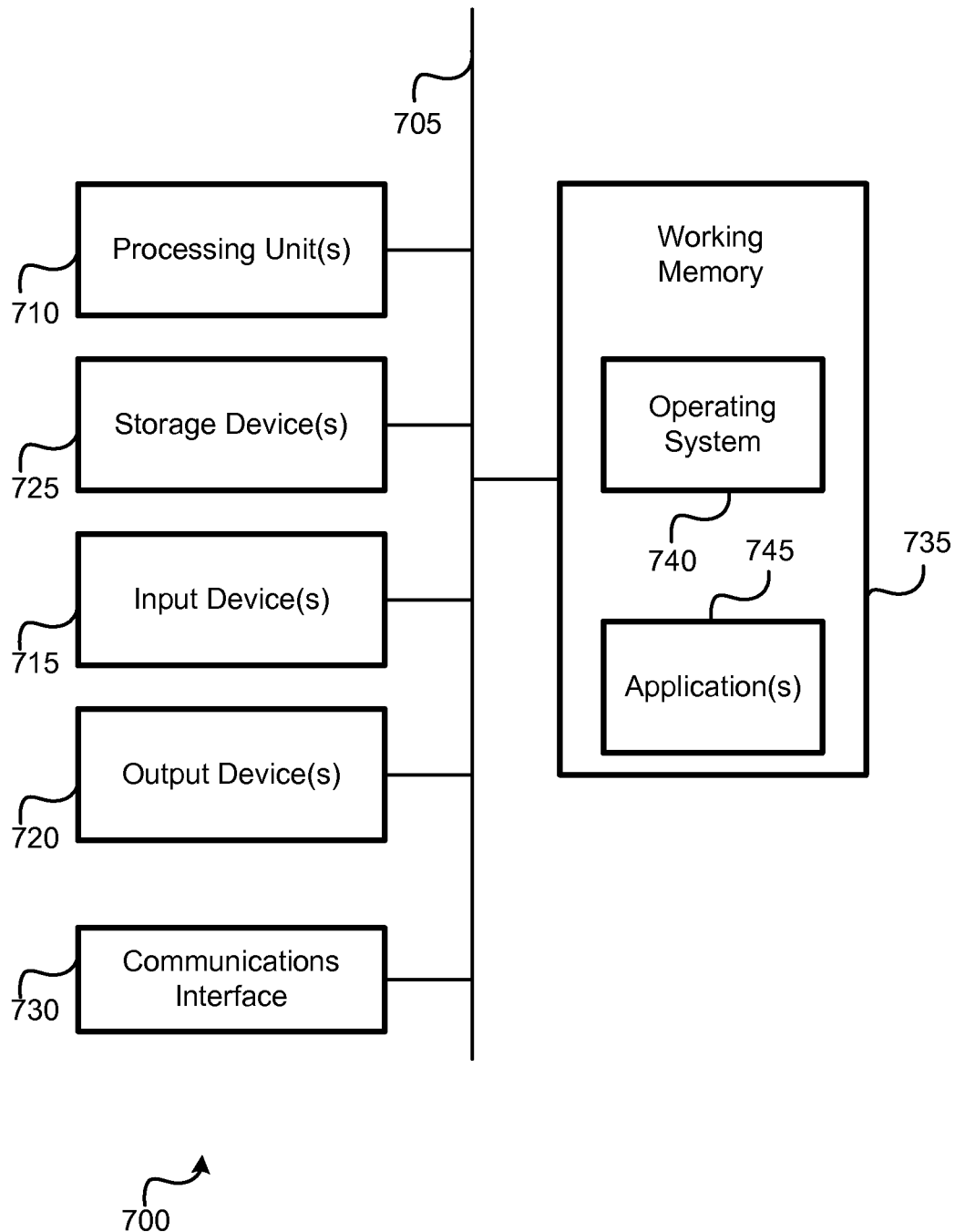
FIG. 7 illustrates an embodiment of a computer system.

FIG. 7 illustrates an embodiment of a computer system 700, which may be configured to execute various components described herein using any combination of hardware and/or software. For example, one or more computer systems 700 can be configured to execute the functionality of one or more nodes, as described herein and illustrated in FIGS. 2-6. One or more computer systems 700 may additionally or alternatively be used to implement the functionality of the API as described herein and illustrated in FIG. 6, and/or the methods described in relation to FIGS. 3, 4, and 6. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical locations.

The computer system 700 is shown comprising hardware elements that can be electrically coupled via a bus 705 (or may otherwise be in communication, as appropriate). The hardware elements may include processing unit(s) 710, which can include without limitation one or more general-purpose processors, one or more special-purpose processors (such as digital signal processors, graphics acceleration processors, application-specific integrated circuits (ASICs), system on a chip (SoC), and/or the like), and/or other processing structures. The processing unit(s) 710 can be configured to perform one or more of the methods described herein, including the methods described in relation to FIGS. 3, 4, and 6, by, for example, executing commands stored in a memory. The computer system 700 also can include one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage. This can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

For embodiments such as those described above, the storage device(s) 725 can be viewed as a storage resource of a node. In an embodiment in which the node network is part of the CHIMPS 110 of FIG. 1, different portions of the storage device(s) 725 may be allocated for different purposes. There may be, for example, a "permanent" memory in which an "original" copy of an asset (e.g., media file) may be stored by the node network, and accessed by other nodes of the network. Another part of the storage device(s) 725 may serve as a cache, or "temporary" memory, in which assets may be stored but rewritten. A node (or other computer system) may choose to store frequently-accessed files and/or other information in the cache to save time (verses requesting them from a node or storage device having the "original" copy). Furthermore, these different allocated memories may be stored on different devices (e.g., solid state memory vs. a magnetic hard drive), depending on usage, speed, and/or other concerns.

The computer system 700 can also include a communications interface 730, which can include wireless and wired communication technologies. Accordingly, the communications interface can include a modem, a network card (wireless or wired), an infrared communication device, a wireless communication device, and/or a chipset (such as a Bluetooth™ device, an IEEE 702.11 device, an IEEE 702.15.4 device, a WiFi device, a WiMax device, cellular communication facilities, UWB interface, etc.), and/or the like. The communications interface 730 can therefore permit the computer system 700 to be exchanged with other devices and components of a network.

In many embodiments, the computer system 700 will further comprise a working memory 735, which can include a RAM or ROM device, as described above. Software elements, shown as being located within the working memory 735, can include an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to the methods described in relation to FIGS. 3, 4, and 6, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processing unit(s) 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit(s) 710 to perform one or more procedures of the methods described herein. Additionally or alternatively, portions of the methods described herein may be executed through specialized hardware.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A server configured to operate as a node in a network of nodes, the server comprising:
    a communication interface configured to be communicatively coupled with a plurality of nodes of the network of nodes;
    a memory; and
    a processing unit communicatively coupled with the communication interface and the memory and configured to:
        obtain, via the communication interface from a first node of the plurality of nodes, a first request comprising:
            a request identifier,
            a description of a first task to perform, and
            information regarding an entity originating the first request;
        determine that the first request was not previously received, wherein the determining that the first request was not previously received comprises checking the memory for the request identifier of the first request;
        subsequent to the determining that the first request was not previously received, determine that the server does not have sufficient resources to perform the first task at the server;
        as a result of determining that the server does not have sufficient resources to perform the first task at the server, randomly select a second node from the plurality of nodes; and prior to the second node determining whether the second node has sufficient resources to perform the first task, send, via the communication interface, the first request to the second node.

2. The server configured to operate as a node in a network of nodes as recited in claim 1, wherein the processing unit is further configured to store the request identifier of the first request.

3. The server configured to operate as a node in a network of nodes as recited in claim 2, wherein the processing unit is further configured to:
receive a second request;
compare a request identifier of the second request with the stored request identifier of the first request; and
send a response to a sender of the second request an indication that the server has already received a request having the same request identifier.

4. The server configured to operate as a node in a network of nodes as recited in claim 1, wherein the processing unit is configured to randomly select the second node from the plurality of nodes by randomly selecting the second node using a uniform distribution.

5. The server configured to operate as a node in a network of nodes as recited in claim 1, wherein the processing unit is configured to randomly select the second node from the plurality of nodes by randomly selecting the second node using a weighted distribution.

6. The server configured to operate as a node in a network of nodes as recited in claim 5, wherein the processing unit is further configured to create the weighted distribution by assigning a weight to each of the plurality of nodes based on either or both of:
a geographical location or distance, or
historical information regarding each of the plurality of nodes.

7. The server configured to operate as a node in a network of nodes as recited in claim 1, wherein the processing unit is further configured to:
receive, via the communication interface, a second request comprising:
a second request identifier,
a description of a second task to perform, and
information regarding an entity originating the second request;
perform the second task; and
send, via the communication interface, an indication to the entity originating the second request that the second task has been performed.

8. A method of load balancing in a network of nodes, the method comprising:
obtaining, from a first node of a plurality of nodes of the network of nodes, a first request comprising:
a request identifier,
a description of a first task to perform, and
information regarding an entity originating the first request;
determining that the first request was not previously received, wherein the determining that the first request was not previously received comprises checking a memory for the request identifier of the first request;
subsequent to the determining that the first request was not previously received, determining, using a physical processing unit, that a computing system does not have sufficient resources to perform the first task at the computing system;
as a result of the determination, randomly selecting a second node from the plurality of nodes to which the computing system is communicatively connected; and
prior to the second node determining whether the second node has sufficient resources to perform the first task, sending the first request to the second node.

9. The method of load balancing in a network of nodes as recited in claim 8, further comprising storing the request identifier of the first request in the memory.

10. The method of load balancing in a network of nodes as recited in claim 9, further comprising:
receiving a second request;
comparing a request identifier of the second request with the stored request identifier of the first request; and
sending a response to a sender of the second request an indication that the computing system has already received a request having the same request identifier.

11. The method of load balancing in a network of nodes as recited in claim 8, wherein randomly selecting the second node from the plurality of nodes comprises randomly selecting the second node using a uniform distribution.

12. The method of load balancing in a network of nodes as recited in claim 8, wherein randomly selecting the second node from the plurality of nodes comprises randomly selecting the second node using a weighted distribution.

13. The method of load balancing in a network of nodes as recited in claim 8, further comprising:
receiving, a second request comprising:
a second request identifier,
a description of a second task to perform, and
information regarding an entity originating the second request;
performing the second task; and
sending an indication to the entity originating the second request that the second task has been performed.

14. A non-transitory computer-readable medium having instructions embedded thereon for providing load balancing in a network of nodes, the instructions including computer code for:
obtaining, from a first node of a plurality of nodes of the network of nodes, a first request comprising:
a request identifier,
a description of a first task to perform, and
information regarding an entity originating the first request;
determining that the first request was not previously received, wherein the determining that the first request was not previously received comprises checking a memory for the request identifier of the first request;
subsequent to the determining that the first request was not previously received, determining that a computing system does not have sufficient resources to perform the first task at the computing system;
as a result of the determination, randomly selecting a second node from the plurality of nodes to which the computing system is communicatively connected; and
prior to the second node determining whether the second node has sufficient resources to perform the first task, sending the first request to the second node.

15. The computer-readable medium as recited in claim 14, further comprising computer code for storing the request identifier of the first request in the memory.

16. The computer-readable medium as recited in claim 15, further comprising computer code for:
receiving a second request;
comparing a request identifier of the second request with the stored request identifier of the first request; and sending a response to a sender of the second request an indication that the computing system has already received a request having the same request identifier.

17. The computer-readable medium as recited in claim 14, wherein the computer code for randomly selecting the second node from the plurality of nodes comprises computer code for randomly selecting the second node using a uniform distribution.

18. The computer-readable medium as recited in claim 14, further comprising computer code for:
- receiving, a second request comprising:
  - a second request identifier,
  - a description of a second task to perform, and
  - information regarding an entity originating the second request;
- performing the second task; and
- sending an indication to the entity originating the second request that the second task has been performed.

\* \* \* \* \*